(12) United States Patent
Jovanovski et al.

(10) Patent No.: US 8,939,374 B2
(45) Date of Patent: Jan. 27, 2015

(54) TERMINAL HAVING ILLUMINATION AND EXPOSURE CONTROL

(75) Inventors: Brian L. Jovanovski, Syracuse, NY (US); Alexey Chernyakov, Ithaca, NY (US); Daniel Van Volkinburg, Syracuse, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 126 days.

(21) Appl. No.: 12/981,793

(22) Filed: Dec. 30, 2010

(65) Prior Publication Data

US 2012/0168507 A1    Jul. 5, 2012

(51) Int. Cl.
*G06K 7/10*    (2006.01)

(52) U.S. Cl.
CPC ........ *G06K 7/10732* (2013.01); *G06K 7/10752* (2013.01); *G06K 7/10851* (2013.01)
USPC ............ 235/462.42; 235/462.41; 235/462.01; 235/462.1

(58) Field of Classification Search
USPC .............. 235/462.26, 462.28, 462.41–462.42
See application file for complete search history.

(56) References Cited

U.S. PATENT DOCUMENTS

| | | | |
|---|---|---|---|
| 5,510,607 A | 4/1996 | Ishikawa | |
| 5,517,018 A | 5/1996 | Zheng et al. | |
| 5,659,431 A | 8/1997 | Ackley | |
| 5,808,286 A | 9/1998 | Nukui et al. | |
| 5,811,777 A | 9/1998 | Ackley | |
| 5,814,803 A | 9/1998 | Olmstead et al. | |
| 5,821,518 A | 10/1998 | Sussmeier et al. | |
| 6,034,379 A | 3/2000 | Bunte et al. | |
| 6,039,258 A | 3/2000 | Durbin et al. | |
| 6,105,869 A | 8/2000 | Scharf et al. | |
| 6,155,488 A | 12/2000 | Olmstead et al. | |
| 6,176,429 B1 * | 1/2001 | Reddersen et al. | ...... 235/462.25 |
| 6,230,975 B1 | 5/2001 | Colley et al. | |
| 6,249,008 B1 | 6/2001 | Bunte et al. | |
| 6,278,490 B1 | 8/2001 | Fukuda et al. | |
| 6,283,374 B1 | 9/2001 | Fantone et al. | |
| 6,817,525 B2 | 11/2004 | Piva et al. | |
| 7,044,378 B2 | 5/2006 | Patel et al. | |
| 7,097,102 B2 | 8/2006 | Patel et al. | |
| 7,204,418 B2 | 4/2007 | Joseph et al. | |

(Continued)

OTHER PUBLICATIONS

Feb. 14, 2013 Communication pursuant to Article 94(3) EPC in European Application No. 11195457.4.

(Continued)

*Primary Examiner* — Christopher Stanford
(74) *Attorney, Agent, or Firm* — Additon, Higgins & Pendleton, P.A.

(57) ABSTRACT

There is set forth herein an indicia reading terminal having a first illumination and exposure control configuration and a second illumination and exposure control configuration, the first illumination and control configuration having a first associated illumination control and a first associated exposure control, the second illumination and exposure control configuration having a second associated illumination control and a second associated exposure control, wherein with the first illumination control active an average energization level of the illumination subsystem during exposure of one or more frames is higher than with the second illumination control active, and wherein with the first exposure control active an average exposure period of the image sensor array is shorter than with the second exposure control active.

30 Claims, 5 Drawing Sheets

(56) References Cited

U.S. PATENT DOCUMENTS

| | | |
|---|---|---|
| 7,204,420 B2 | 4/2007 | Barkan et al. |
| 7,219,843 B2 * | 5/2007 | Havens et al. ........... 235/462.42 |
| 7,229,021 B2 | 6/2007 | Vesikivi et al. |
| 7,261,238 B1 | 8/2007 | Carlson et al. |
| 7,290,711 B2 | 11/2007 | Barkan |
| 7,296,744 B2 | 11/2007 | He et al. |
| 7,350,711 B2 | 4/2008 | He et al. |
| 7,457,476 B2 | 11/2008 | Olsson |
| 7,461,790 B2 | 12/2008 | McQueen et al. |
| 7,475,823 B2 | 1/2009 | Brock et al. |
| 7,597,263 B2 | 10/2009 | Vinogradov et al. |
| 7,604,174 B2 | 10/2009 | Gerst, III et al. |
| 7,654,461 B2 | 2/2010 | Kotlarsky et al. |
| 2006/0202036 A1 * | 9/2006 | Wang et al. .............. 235/462.07 |
| 2009/0001163 A1 | 1/2009 | Barkan et al. |
| 2010/0044436 A1 | 2/2010 | Powell et al. |
| 2010/0147947 A1 | 6/2010 | Aker et al. |

OTHER PUBLICATIONS

Feb. 4, 2013 European Search Report in European Application No. 11195457.4.

* cited by examiner

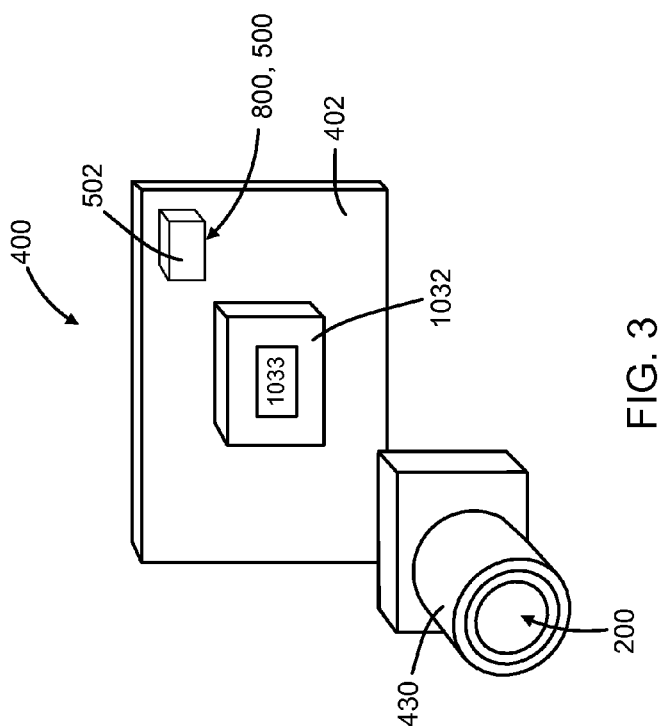
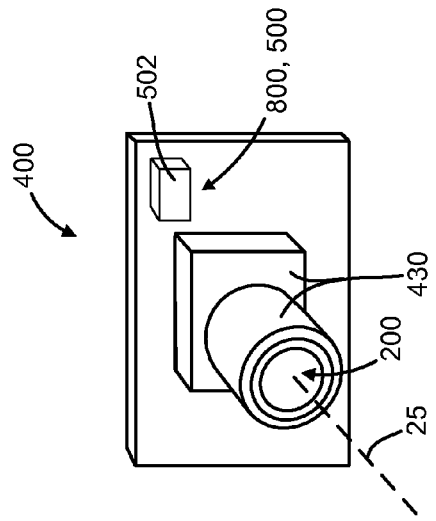

TERMINAL HAVING ILLUMINATION AND EXPOSURE CONTROL

FIELD OF THE INVENTION

The present invention relates in general to optical based registers, and particularly is related to an image sensor based indicia reading terminal.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 3 is an exploded assembly perspective view of an imaging module;

FIG. 4 is a perspective view of an imaging module;

SUMMARY OF THE INVENTION

There is set forth herein an indicia reading terminal having a first illumination and exposure control configuration and a second illumination and exposure control configuration, the first illumination and exposure control configuration having a first associated illumination control and a first associated exposure control, the second illumination and exposure control configuration having a second associated illumination control and a second associated exposure control, wherein with the first illumination control active an average energization level of the illumination subsystem during exposure of one or more frames is higher than with the second illumination control active, and wherein with the first exposure control active an average exposure period of the image sensor array is shorter than with the second exposure control active.

DETAILED DESCRIPTION OF THE INVENTION

Figure 1:
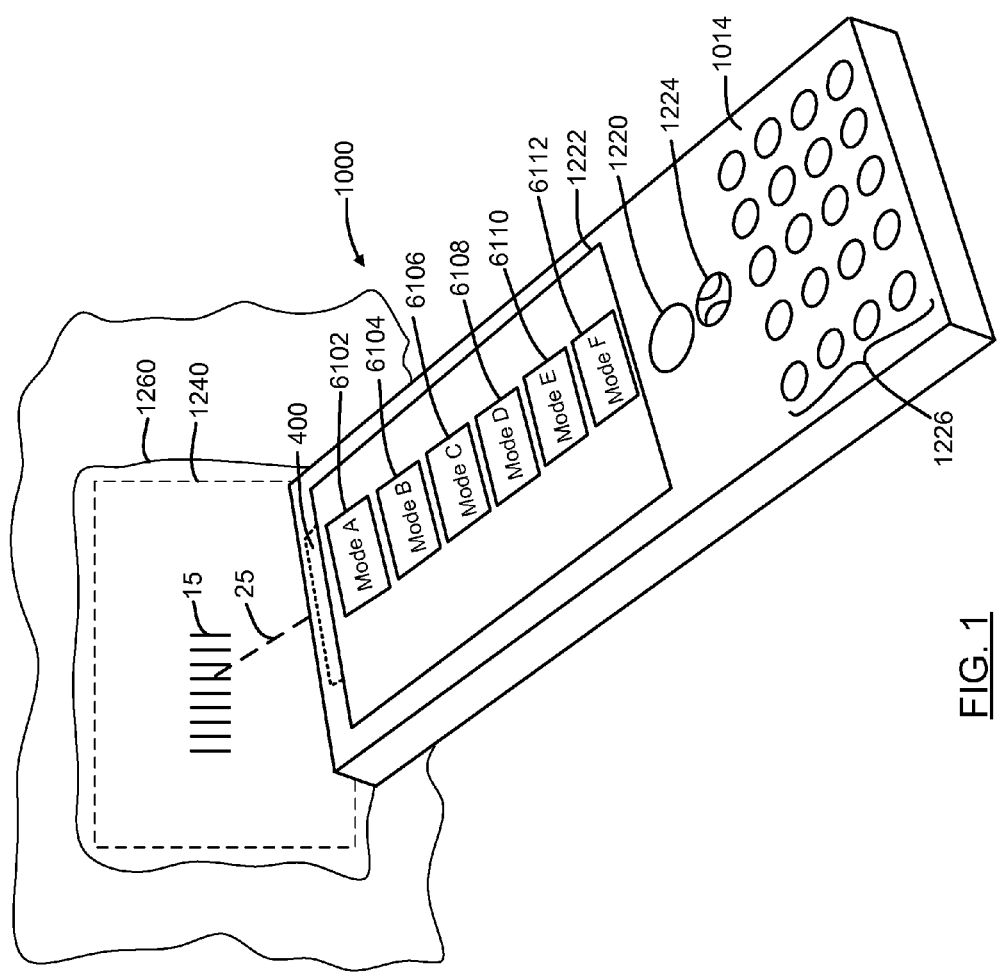
FIG. 1 is a schematic physical form view of an indicia reading terminal in one embodiment.

Referring to FIG. 1, there is set forth herein an indicia reading terminal 1000 having a first illumination and exposure control configuration and a second illumination and exposure control configuration, the first illumination and exposure control configuration having a first associated illumination control and a first associated exposure control, the second illumination and exposure control configuration having a second associated illumination control and a second associated exposure control, wherein with the first illumination control active an average energization level of the illumination subsystem during exposure of one or more frames is higher than with the second illumination control active, and wherein with the first exposure control active an average exposure period of the image sensor array is shorter than with the second exposure control active.

Operational as described, the indicia reading terminal 1000 can be rendered able to read decodable indicia in an expanded range of scanning environments, including moderate to low ambient light environments. In the development of terminal 1000, it was determined that the first illumination and exposure control configuration can optimize terminal 1000 for motion tolerance while the second illumination and exposure control configuration can optimize terminal 1000 for depth of field. By adapting terminal 1000 so that each of the first and second illumination and exposure control configurations can be made active responsively to an activation of a trigger signal, terminal 1000 can be rendered better suited for reading of decodable indicia in an expanded range of operating environments.

An exemplary hardware platform for support of operations described herein with reference to an image sensor based indicia reading terminal 1000 is shown and described with reference to FIG. 2.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging subsystem of terminal 1000 can include image sensor 1032 and a lens assembly 200 for focusing an image onto image sensor array 1033 of image sensor 1032.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, imaging lens assembly 200 can be adapted for focusing an image of a decodable indicia 15 located within a field of view 1240 on a substrate, T, onto image sensor array 1033. A size in target space of a field of view 1240 of terminal 1000 can be varied in a number of alternative ways. A size in target space of a field of view 1240 can be varied, e.g., by changing a terminal to target distance, changing an imaging lens assembly setting, changing a number of pixels of image sensor array 1033 that are subject to read out. Imaging light rays can be transmitted about imaging axis 25. Lens assembly 200 can be adapted to be capable of multiple focal lengths and multiple planes of optimum focus (best focus distances).

Terminal 1000 can include an illumination subsystem 800 for illumination of target, T, and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. A physical form view of an example of an illumination subsystem is shown in FIGS. 3-4. As shown in FIGS. 3-4, an imaging module 400 can be provided having a circuit board 402 carrying image sensor 1032 and lens assembly 200 disposed in support 430 disposed on circuit board 402. In the embodiment of FIGS. 3 and 4, illumination subsystem 800 has a light source bank 500 provided by single light source 502. In another embodiment, light source bank 500 can be provided by more than one light source. Terminal 1000 can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with CPU 1060.

Figure 2:
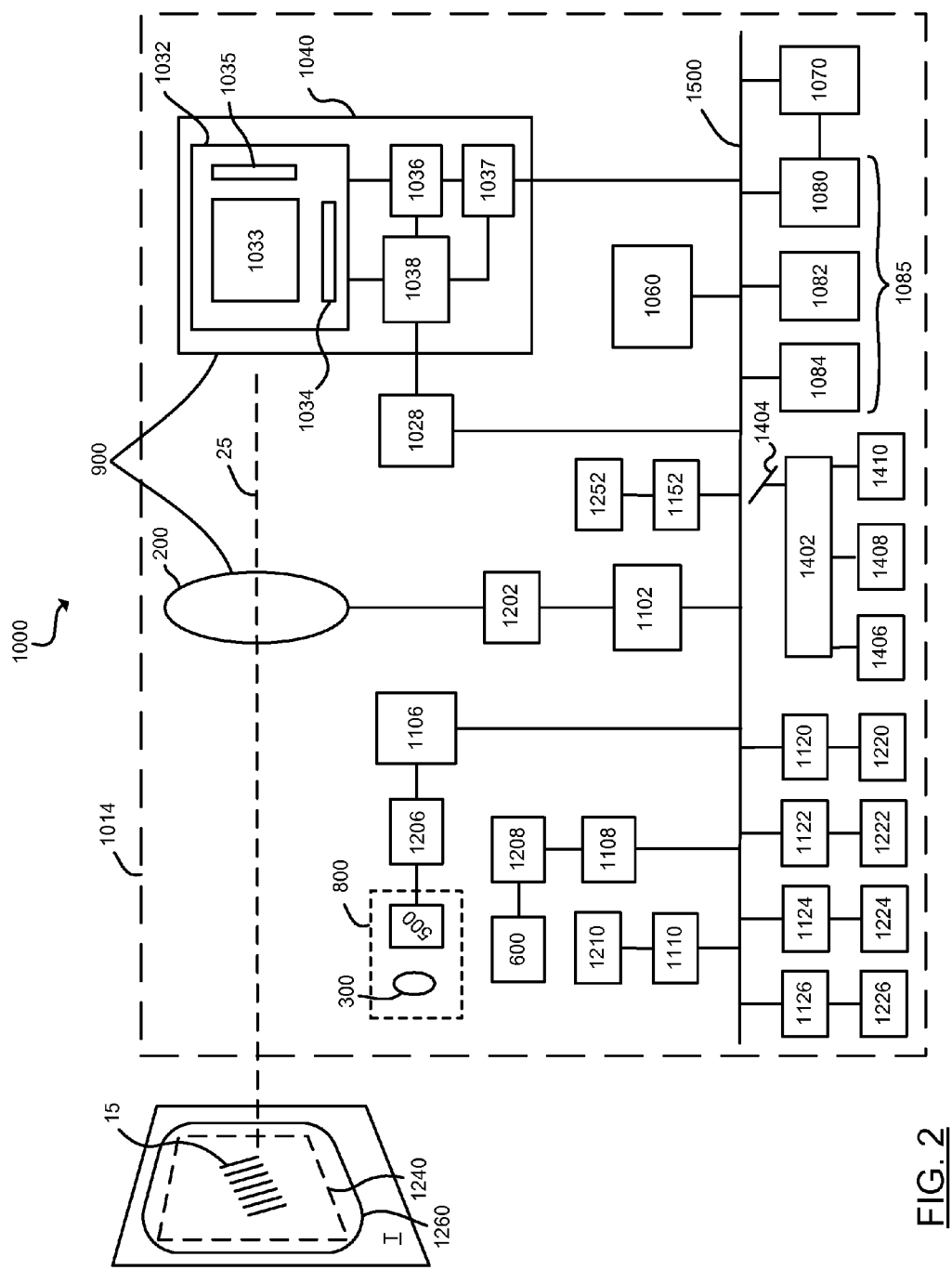
FIG. 2 is a block diagram of an indicia reading terminal in one embodiment.

In one embodiment, illumination subsystem 800 can include, in addition to light source bank 500, an illumination lens assembly 300, as is shown in the embodiment of FIG. 2. In addition to or in place of illumination lens assembly 300 illumination subsystem 800 can include alternative light shaping optics, e.g. one or more diffusers, mirrors and prisms. In use, terminal 1000 can be oriented by an operator with respect to a target, T, (e.g., a piece of paper, a package, another type of substrate) bearing decodable indicia 15 in such manner that illumination pattern 1260 is projected on a decodable indicia 15. In the example of FIG. 2, decodable indicia 15 is provided by a 1D bar code symbol. Decodable indicia 15 could also be provided by a 2D bar code symbol or optical character recognition (OCR) characters. Referring to further aspects of terminal 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, terminal 1000 can include power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410).

Further regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Terminal 1000 can also include a display 1222 coupled to system bus 1500 and in communication with CPU 1060, via interface 1122, as well as pointer mechanism 1224 in communication with CPU 1060 via interface 1124 connected to system bus 1500. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Further aspects of terminal 1000 in one embodiment are described with reference again to FIG. 1. Trigger 1220, display 1222, pointer mechanism 1224, and keyboard 1226 can be disposed on a common side of a hand held housing 1014 as shown in FIG. 1. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor. Imaging module 400 including image sensor array 1033 and imaging lens assembly 200 can be incorporated in hand held housing 1014.

Figure 5:
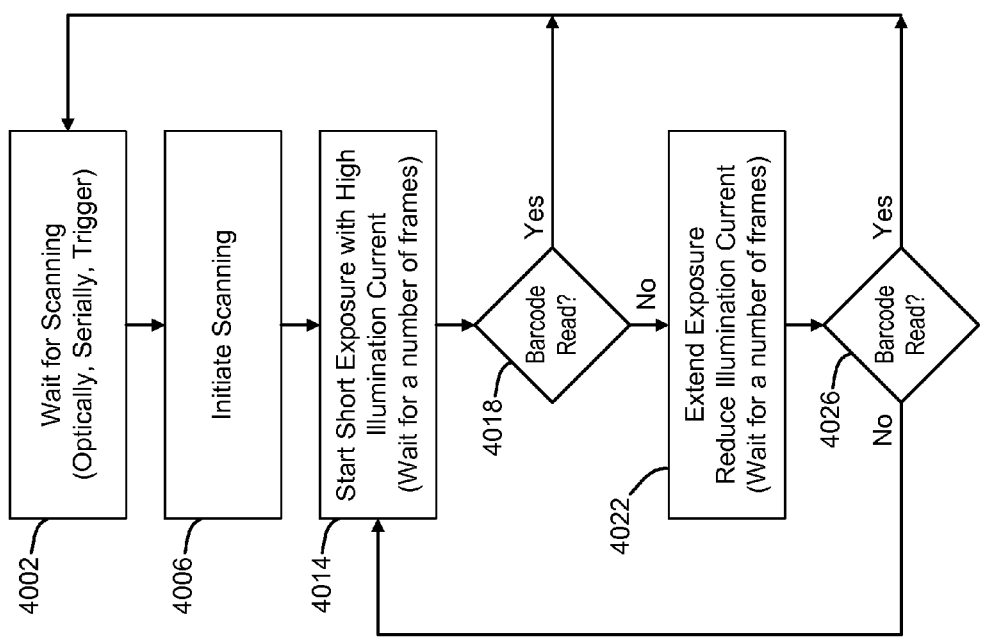
FIG. 5 is a flow diagram illustrating a method which can be performed by an indicia reading terminal.

A flow diagram illustrating an embodiment of a method herein is set forth in FIG. 5. At block 4002, terminal 1000 can wait for scanning to be initiated and at block 4006, scanning can be initiated, e.g., by activation of a trigger signal via actuation of trigger 1220. A trigger signal can also be activated, e.g., via object detection, or a serial command from an external computer. At block 4014, terminal 1000 can capture one or more frames of image data utilizing a first illumination and exposure control configuration. In the specific embodiment set forth with reference to FIG. 5, the first illumination and exposure control configuration can be characterized by a relatively high illumination subsystem average energization level during exposure periods and a relatively shorter average exposure period. At block 4018, terminal 1000 can attempt to decode a decodable indicia represented in the one or more captured frames captured with the first illumination and exposure control configuration active. At block 4022 if decoding fails, terminal 1000 can activate a second illumination and exposure control configuration and capture one or more frames utilizing the second illumination and exposure control configuration. At block 4026 terminal 1000 can attempt to decode a decodable indicia represented in the one or more captured frames captured with the second illumination and exposure control configuration active and, if decoding fails can return to block 4014. The second illumination and exposure control configuration can be characterized by a relatively low illumination subsystem energization level and a relatively longer exposure period. In one embodiment, CPU 1060 can be operative to execute programming instructions for execution of the method of FIG. 5.

Figure 6:
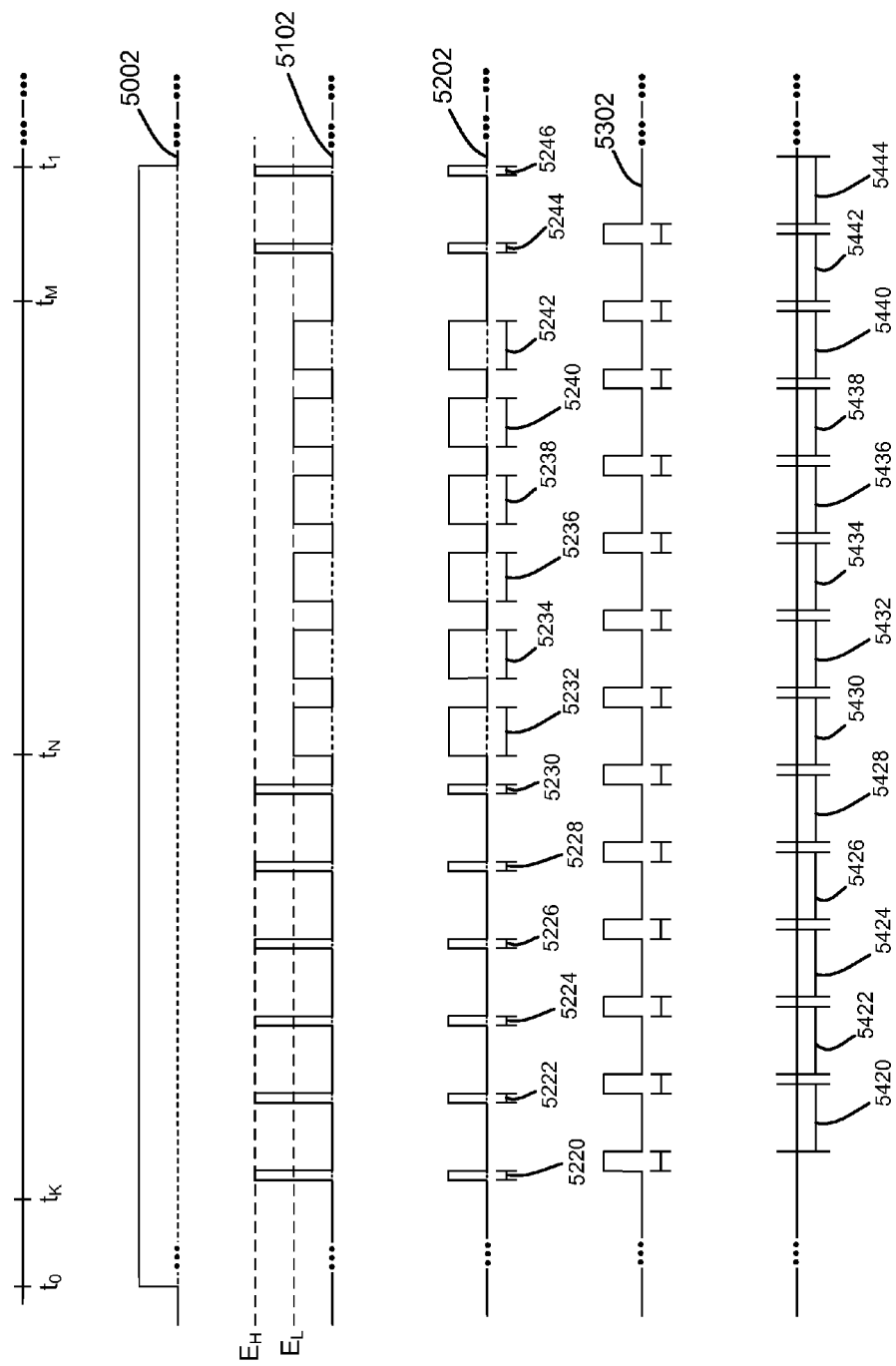
FIG. 6 is a timing diagram illustrating a method which can be performed by an indicia reading terminal.

A timing diagram illustrating operation of the terminal 1000 during performance of the method indicated by the flow diagram as shown in FIG. 6. Referring to the timing diagram of FIG. 6, signal 5002 is a trigger signal which can be made active, e.g., via actuation of trigger 1220. Signal 5102 is an illumination energization level signal having varying energization levels. Signal 5202 is an exposure control signal having active states defining exposure periods and inactive states intermediate exposure periods. Signal 5302 is a readout control signal. When readout control signal 5302 is active, image signals can be read out of image sensor array 1033. Further regarding the timing diagram of FIG. 6, periods 5420-5444 are periods at which CPU 1060 can process frames of image data, e.g., for attempting to decode for decodable indicia. Terminal 1000 can be operative so that prior to exposure period 5220 and after time $t_o$, terminal 1000 can be capturing "parameter determination" frames that are processed for parameter determination and in some instances, not subject to decode attempt. For capture of parameter determination frames, terminal 1000 can be operating in other than a first or second illumination exposure control configuration.

Referring to the timing diagram of FIG. 6, it is seen that at time $t_N$, terminal 1000 can switch an illumination and exposure control configuration from a first configuration to a second configuration. In the particular timing diagram of FIG. 6, a first illumination and exposure control configuration is active after time $t_K$ and prior to time $t_N$ and again after time $t_M$, and a second illumination and exposure control configuration is active after time $t_N$ and prior to time $t_M$. In the particular embodiment illustrated with reference to the timing diagram of FIG. 6, illumination energization level $E_H$ of terminal 1000 with the first illumination and exposure control configuration active can have a first energization level during exposure periods 5220-5230, 5244-5246, and exposure periods 5220-5230, 5244-5246 with the first illumination and exposure control configuration active can be of a first duration. Further in the particular embodiment illustrated with reference to the timing diagram of FIG. 6, illumination energization levels of terminal 1000 with the second illumination and exposure control configuration active can have a second energization level $E_L$ during exposure periods 5232-5242, and exposure periods 5232-5242 with the second illumination and exposure control configuration active can be of a second duration. In one embodiment, one or more light source of light source bank 500 can have a maximum continuous operation energization rating (e.g., expressed as a maximum current and/or voltage) and during exposure periods 5220-5230, 5244-5446, can be driven in excess of the maximum continuous operation energization rating. In the development of terminal 1000, it was determined that such "over driving" can be accomplished safely provided that illumination "on" times (which can coincide with exposure periods 5220-5230, 5244-5246) are of sufficiently short duration.

In the particular example of FIG. 6, the illumination and exposure controls of terminal 1000 with the first and second illumination and exposure control configurations active are controls for control of the both illumination and exposure values to be at certain fixed values through the time the illumination and exposure control configuration is active resulting in the average illumination energization level during exposure periods to be a value coinciding with the fixed illumination energization level and the average exposure period to be a duration coinciding with the fixed exposure period duration.

However, different illumination energization level controls and/or exposure controls can be associated to one or more of the first illumination and exposure control configuration and second illumination exposure control configuration but nevertheless the result can be provided that an average illumination energization level with the first configuration active can be greater than with the second configuration and the average exposure period can be of shorter duration with the first configuration active than the second configuration active.

In one example of an alternative illumination control, an illumination energization level during a succession of exposure period can be controlled to be variable from exposure period to exposure period but be restricted from exceeding a threshold, e.g., a relatively higher threshold with the first illumination and exposure control configuration active and a relatively lower threshold with the second illumination and exposure control configuration active. With or without the noted energization level restricting, an illumination control can be characterized by an initial illumination energization level (e.g., higher for the first configuration lower for the second) for an initial frame after a switch to a certain illumination and exposure control configuration with subsequent frame illumination levels with the configuration active being determined responsively to a determined brightness of a recently captured frame (e.g., which can be determined by averaging a sample of pixel values of a recently captured frame).

In one example of an alternative exposure control, an exposure period can be controlled to variable from frame to frame but can be restricted from exceeding a threshold, e.g., a relatively shorter threshold with the first illumination and exposure control configuration active and a relatively longer threshold with the second illumination and exposure control configuration active. With or without the noted exposure period restricting, an exposure control can be characterized by an initial exposure level for an initial frame after a switch to a certain illumination and exposure control configuration with subsequent frame exposure periods with the configuration active being determined responsively to a brightness of a recently captured frame.

It has been described that an average energization level of illumination subsystem 800 during exposure periods with the first illumination and exposure control configuration active can be higher than an average illumination energization level during exposure periods with the second illumination and exposure control configuration active. However, as can be observed with reference to the timing diagram of FIG. 6, and noting that illumination on times corresponding to exposure periods can be substantially shorter with the first illumination and exposure control configuration active than with the second illumination and exposure control configuration active, an average energization level of illumination subsystem 800 over time (considering exposure periods and periods intermediate exposure periods) with the first illumination exposure control configuration active can be lower than an average energization level over time with the second illumination exposure control configuration active.

In one embodiment, an average energization level of illumination subsystem 800 during exposure periods with the first illumination and exposure control configuration active in comparison to an average energization level of illumination subsystem 800 during exposure periods with the second illumination and exposure control configuration active can exhibit a ratio (a dynamic range) of greater than 2:1. In another embodiment an average energization level of illumination subsystem 800 during exposure periods with the first illumination and exposure control configuration active in comparison to an average energization level of illumination subsystem 800 during exposure periods with the second illumination and exposure control configuration active can exhibit a ratio (a dynamic range) of greater than 3:1. In another embodiment an average energization level of illumination subsystem 800 during exposure periods with the first illumination and exposure control configuration active in comparison to an average energization level of illumination subsystem 800 during exposure periods with the second illumination and exposure control configuration active can exhibit a ratio (a dynamic range) of greater than 4:1. In another embodiment an average energization level of illumination subsystem 800 during exposure periods with the first illumination and exposure control configuration active in comparison to an average energization level of illumination subsystem 800 during exposure periods with the second illumination and exposure control configuration active can exhibit a ratio (a dynamic range) of greater than 5:1. In another embodiment an average energization level of illumination subsystem 800 during exposure periods with the first illumination and exposure control configuration active in comparison to an average energization level of illumination subsystem 800 during exposure periods with the second illumination and exposure control configuration active can exhibit a ratio (a dynamic range) of greater than 10:1. In a specific example an average energization level of illumination subsystem 800 during exposure periods with the first illumination and exposure control configuration active in comparison to an average energization level of illumination subsystem 800 during exposure periods with the second illumination and exposure control configuration active can exhibit a ratio (a dynamic range) of about 6.67:1 (~1 Ampere, ~N Volts continuous during exposure periods with first illumination and exposure control configuration active, ~150 ma, ~N Volts continuous during exposure periods with second illumination and exposure control configuration active).

In one embodiment an average exposure period of image sensor array 1033 with the first illumination and exposure control configuration active in comparison to an average exposure period of terminal 1000 with the second illumination and exposure control configuration active can exhibit a ratio (a dynamic) range of less than 1:2. In another embodiment an average exposure period of image sensor array 1033 with the first illumination and exposure control configuration active in comparison to an average exposure period of terminal 1000 with the second illumination and exposure control configuration active can exhibit a ratio (a dynamic) range of less than 1:3. In another embodiment an average exposure period of image sensor array 1033 with the first illumination and exposure control configuration active in comparison to an average exposure period of terminal 1000 with the second illumination and exposure control configuration active can exhibit a ratio (a dynamic) range of less than 1:4. In another embodiment an average exposure period of image sensor array 1033 with the first illumination and exposure control configuration active in comparison to an average exposure period of terminal 1000 with the second illumination and exposure control configuration active can exhibit a ratio (a dynamic) range of less than 1:5. In another embodiment an average exposure period of image sensor array 1033 with the first illumination and exposure control configuration active in comparison to an average exposure period of terminal 1000 with the second illumination and exposure control configuration active can exhibit a ratio (a dynamic) range of less than 1:10. In another embodiment an average exposure period of image sensor array 1033 with the first illumination and exposure control configuration active in comparison to an average exposure period of terminal 1000 with the second illumination and exposure control configuration active can exhibit a ratio (a dynamic) range of less than 1:20. In another embodiment an average exposure period of image sensor array 1033 with the first illumination and exposure control configuration active in comparison to an average exposure period of terminal 1000 with the second illumination and exposure control configuration active can exhibit a ratio (a dynamic) range of less than 1:50. In a specific example, an average exposure period of image sensor array 1033 with the first illumination and exposure control configuration active in comparison to an average exposure period of terminal 1000 with the second illumination and exposure control configuration active can exhibit a ratio (a dynamic) range of about 1:16 (~500 μs, first illumination and exposure control configuration, ~8000 μs, second illumination and exposure control configuration). In another specific example, an average exposure period of image sensor array 1033 with the first illumination and exposure control configuration active in comparison to an average exposure period of terminal 1000 with the second illumination and exposure control configuration active can exhibit a ratio (a dynamic) range of about 1:80 (~100 vs, first illumination and exposure control configuration, ~8000 vs, second illumination and exposure control configuration).

Further aspects of an indicia reading terminal 1000 are described with reference to Table A, showing various possible user selected modes of operation in which terminal 1000 can switch between a first illumination and exposure control configuration and a second illumination and exposure control configuration. In Table A, frames captured utilizing the first illumination and exposure control configuration are designated as "$1^{st}$" frames, and frames captured utilizing the second illumination and exposure control configuration are designated as "$2^{nd}$" frames.

Referring to FIG. 1 and Table A herein below, indicia reading terminal 1000 can have a plurality of different operator selectable operating modes in which terminal 1000, responsively to a trigger signal activation, can switch between a first illumination and exposure control configuration and a second illumination and exposure control configuration for capture of frames that can be subject to a decode attempt. In one example, a user interface display 1222 can display various buttons 6102, 6104, 6106, 6108, 6110, 6112 corresponding to various modes allowing an operator to actuate one mode out of a plurality of modes.

TABLE A

| | | | | | | | | Frame Number | | | | | | | | |
|---|---|---|---|---|---|---|---|---|---|---|---|---|---|---|---|---|
| Mode | ... | N − 6 | N − 5 | N − 4 | N − 3 | N − 2 | N − 1 | N | N + 1 | N + 2 | N + 3 | N + 4 | N + 5 | N + 6 | N + 7 | ... |
| A | ... | $1^{st}$ | $1^{st}$ | $1^{st}$ | $1^{st}$ | $1^{st}$ | $1^{st}$ | $2^{nd}$ | $2^{nd}$ | $2^{nd}$ | $2^{nd}$ | $2^{nd}$ | $2^{nd}$ | $1^{st}$ | $1^{st}$ | ... |
| B | ... | $2^{nd}$ | $2^{nd}$ | $2^{nd}$ | $2^{nd}$ | $2^{nd}$ | $2^{nd}$ | $1^{st}$ | $1^{st}$ | $1^{st}$ | $1^{st}$ | $1^{st}$ | $1^{st}$ | $2^{nd}$ | $2^{nd}$ | ... |
| C | ... | $2^{nd}$ | $1^{st}$ | $1^{st}$ | $1^{st}$ | $2^{nd}$ | $1^{st}$ | $2^{nd}$ | $1^{st}$ | $2^{nd}$ | $1^{st}$ | $2^{nd}$ | $1^{st}$ | $2^{nd}$ | $1^{st}$ | ... |
| D | ... | $2^{nd}$ | $2^{nd}$ | $2^{nd}$ | $2^{nd}$ | $1^{st}$ | $1^{st}$ | $1^{st}$ | $1^{st}$ | $1^{st}$ | $1^{st}$ | $1^{st}$ | $1^{st}$ | $1^{st}$ | $1^{st}$ | ... |

TABLE A-continued

| | | | | | | Frame Number | | | | | | | | | |
|---|---|---|---|---|---|---|---|---|---|---|---|---|---|---|---|
| Mode | ... | N−6 | N−5 | N−4 | N−3 | N−2 | N−1 | N | N+1 | N+2 | N+3 | N+4 | N+5 | N+6 | N+7 ... |
| E | ... | 1st | $1^{st}$ | $1^{st}$ | $1^{st}$ | $1^{st}$ | $1^{st}$ | $2^{nd}$ | $2^{nd}$ | $2^{nd}$ | $2^{nd}$ | $2^{nd}$ | $2^{nd}$ | $2^{nd}$ | $2^{nd}$ ... |
| F | ... | $1^{st}$ | $1^{st}$ | $1^{st}$ | $2^{nd}$ | $2^{nd}$ | $2^{nd}$ | $3^{rd}$ | $3^{rd}$ | $3^{rd}$ | $1^{st}$ | $1^{st}$ | $1^{st}$ | $2^{nd}$ | $2^{nd}$ ... |

Regarding Mode A, Mode A illustrates a mode corresponding to the flow diagram of FIG. 6. In Mode A, terminal 1000 can alternatively activate a first illumination and exposure control configuration and a second illumination and exposure control configuration on an open loop basis. In the illustrated Mode A, terminal 1000 can be operative to alternatively activate a first illumination and exposure control configuration for capture of N=6 frames and a second illumination and exposure control configuration for capture of N=6 frames. The alternating between configurations can be on an open loop basis, i.e., can be independent of a sensed condition and can continue until a trigger signal deactivation, e.g., responsively to release of trigger 1220 or a successful decode of a decodable indicia.

Regarding Mode B, Mode B corresponds to Mode A except that an order of the illumination and exposure control configurations is reversed. Mode B illustrates that advantages can be yielded irrespective of an ordering of the activation between the first illumination and exposure control configuration and the second illumination and exposure control configuration responsively to a trigger signal activation.

Regarding Mode C, terminal 1000 with Mode C active alternatingly activates the first illumination and exposure control configuration and the second illumination and exposure control configuration on a frame by frame based. Mode C illustrates that a period of activation for the respective first and second illumination and exposure control configuration can be changed.

In Modes A and B, the period of activation for both illumination and exposure control configurations is P=6 frames, wherein in Mode C, the period is N=1 frame.

Referring to Modes A, B, and C, terminal 1000 can alternate the first and second illumination and exposure control configurations on an open loop basis. Regarding Modes D and E, Modes D and E illustrate modes in which terminal 1000 activates an illumination and exposure control configuration responsively to a sensed condition.

With Mode D active, terminal 1000 can be operative to activate the first exposure and control configuration responsively to a sensed motion of terminal 1000. Referring again to the block diagram of FIG. 2, terminal 1000 can include an accelerometer 1252 which can be coupled to system bus 1500 for communication with CPU 1060 via interface 1152. Terminal 1000 can monitor an output of accelerometer 1252 for determining a measure of motion of terminal 1000. Terminal 1000 can also compare pixel values of successive frames for determining a measure of motion of terminal 1000 (with an increase in motion the pixel values of corresponding pixel positions of successive frames can be expected to increase). Referring to Mode D, terminal 1000 can be operative so that responsively to a determination that a measure of motion of terminal 1000 exceeds a threshold measure, terminal 1000 activates the first illumination and exposure control configuration, which as set forth herein adapts terminal 1000 for motion tolerance.

Regarding Mode E, terminal 1000 with Mode E active can monitor an ambient light level. A relatively low ambient light level can indicate that terminal 1000 is located a substantial distance from a target T. Terminal 1000 can be operative in Mode E so that responsively to a determination that an ambient light level has fallen below a threshold, terminal 1000 activates the second illumination and exposure control configuration which as set forth herein can well adapt terminal 1000 for decoding at longer reading depths. An ambient light level can be determined by examining pixel values of a captured frame of image data, e.g., by averaging a frame's pixel values or a sample of such pixel values. Alternatively with Mode E active, terminal 1000 can monitor an output of range detector unit 1210. Terminal 1000 can be operative in Mode E so that responding to a determination that a range of terminal 1000 (its distance to a target) has exceeded a threshold, terminal 1000 activates the second illumination and exposure control configuration which as set forth herein can well adapt terminal 1000 for decoding at longer reading depths.

Referring to Mode F, Mode F illustrates that terminal 1000 can have illumination and exposure control configurations other that the first and second illumination and exposure control configurations as set forth herein. In Mode F, terminal 1000 can be operative to activate the first illumination and exposure control configuration (frames N+3, N+4, N+5) subsequent to activating the second illumination and exposure control configuration (frames N−3, N−2, N−1) responsively to a trigger signal activation but the first illumination and exposure control configuration is not activated successively with respect to the second illumination and exposure control configuration; rather a third illumination and exposure control configuration is activated intermediate the activation of the second and first illumination and exposure control configurations.

A small sample of systems methods and apparatus that are described herein is as follows:

A1. An indicia reading terminal comprising:

an illumination subsystem for projection of an illumination pattern, the illumination subsystem having one or more light source;

an imaging subsystem including an image sensor array and an imaging lens assembly for focusing an image of a target onto the image sensor array;

a hand held housing incorporating the image sensor array;

wherein the indicia reading terminal has a first illumination and exposure control configuration and a second illumination and exposure control configuration, the first illumination and control configuration having a first associated illumination control and a first associated exposure control, the second illumination and exposure control configuration having a second associated illumination control and a second associated exposure control, wherein with the first illumination control active an average energization level of the illumination subsystem during exposure periods of one or more frames is higher than with the second illumination control active, wherein with the first exposure control active an average exposure period of the image sensor array is shorter than with the second exposure control active;

wherein the indicia reading terminal is operative so that responsively to a trigger signal activation the indicia reading terminal activates the first illumination and exposure control configuration for capturing of a first set of frames, the first set of frames comprising one or more successive frames, and activates the second illumination and exposure control configuration for capturing of a second set of frames, the second set of frames comprising one or more successive frames; and wherein the indicia reading terminal is operative so that responsively to the trigger signal activation the indicia reading terminal attempts to decode decodable indicia utilizing one or more frame of the first set of frames and further attempts to decode a decodable indicia utilizing one or more frame of the second set of frames.

A2. The indicia reading terminal of A1, wherein one or more of the first associated illumination control of the first illumination and exposure control configuration and the second associated illumination control of the second illumination and exposure control configuration is a control for setting an energization level of the illumination subsystem to a certain predetermined value for each frame exposed during an activation period of the associated illumination and exposure control configuration.

A3. The indicia reading terminal of A1, wherein one or more of the first associated illumination control of the first illumination and exposure control configuration and the second associated illumination control of the second illumination and exposure control configuration is a control that allows an energization level of the illumination subsystem to vary between frames exposed during an activation period of the associated illumination and exposure control configuration.

A4. The indicia reading terminal of A1, wherein one or more of the first associated exposure control of the first illumination and exposure control configuration and the second associated exposure control of the second illumination and exposure control configuration is a control for setting exposure period of the image sensor array to a certain predetermined value for each frame exposed during an activation period of the associated illumination and exposure control configuration.

A5. The indicia reading terminal of A1, wherein one or more of the first associated exposure control of the first illumination and exposure control configuration and the second associated exposure control of the second illumination and exposure control configuration is a control that allows an exposure period of the illumination subsystem to vary between frames exposed during an activation period of the associated illumination and exposure control configuration.

A6. The indicia reading terminal of A1, wherein the indicia reading terminal is adapted so that the indicia reading terminal is operative for switching between activation of the first illumination and exposure control configuration and the second illumination and exposure control configuration on an open loop basis without the switching being responsive to a sensed condition.

A7. The indicia reading terminal of A1, wherein the indicia reading terminal is adapted so that the indicia reading terminal is operative for switching between activation of the first illumination and exposure control configuration and the second illumination and exposure control configuration on a closed loop basis responsively to a sensed condition.

A8. The indicia reading terminal of A1, wherein the indicia reading terminal is adapted so that the indicia reading terminal is operative for switching between activation of the first illumination and exposure control configuration and the second illumination and exposure control configuration on a closed loop basis responsively to a sensed condition, the sensed condition being an ambient light level.

A9. The indicia reading terminal of A1, wherein the indicia reading terminal is adapted so that the indicia reading terminal is operative for switching between activation of the first illumination and exposure control configuration and the second illumination and exposure control configuration on a closed loop basis responsively to a sensed condition, the sensed condition being a terminal range.

A10. The indicia reading terminal of A1, wherein the indicia reading terminal is adapted so that the indicia reading terminal is operative for switching between activation of the first illumination and exposure control configuration and the second illumination and exposure control configuration on a closed loop basis responsively to a sensed condition, the sensed condition being a measurement of motion of the indicia reading terminal.

A11. The indicia reading terminal of A1, wherein one or more of the first set of frames and the second set of frames is a single frame.

A12. The indicia reading terminal of A1, wherein one or more of the first set of frames and the second set of frames is a plurality of frames.

A13. The indicia reading terminal of A1, wherein each of the first set of frames and the second set of frames is a plurality of frames.

A14. The indicia reading terminal of A1, wherein the indicia reading terminal is operative for activating and deactivating one or more of the first illumination and exposure control configuration and the second illumination and exposure control configuration a plurality of times responsively to the activation of the trigger signal.

A15. The indicia reading terminal of A1, wherein the indicia reading terminal is operative so that responsively to activation of the trigger signal the indicia reading terminal activates the second illumination and exposure control configuration prior to activating the second illumination and exposure control configuration.

A16. The imaging terminal of A1, wherein a light source of the illumination subsystem has a maximum continuous operation energization rating, wherein an average energization level of the light source during exposure periods of the image sensor array with the first illumination and exposure control configuration active exceeds the maximum continuous energization rating.

A17. The imaging terminal of A1, wherein a light source of the illumination subsystem has a maximum continuous operation energization rating, wherein an average energization level of the light source during exposure periods with the first illumination and exposure control configuration active exceeds the maximum continuous energization rating, and wherein the average energization level of the light source during exposure periods with the second illumination and exposure control configuration active does not substantially exceed the maximum continuous operation energization rating.

A18. The imaging terminal of A1, wherein a light source of the illumination subsystem has a maximum continuous operation energization rating, wherein an average energization level of the light source during exposure periods with the first illumination and exposure control configuration active is more than twice the maximum continuous energization rating, and wherein the average energization level of the light source during exposure periods with the second illumination and exposure control configuration active does not exceed the maximum continuous operation energization rating.

A19. The indicia reading terminal of A1, wherein an average energization level of the illumination subsystem during exposure periods with the first illumination and exposure control configuration active in comparison to an average energization level of illumination subsystem during exposure periods with the second illumination and exposure control configuration active exhibits a ratio (a dynamic range) of greater than 2:1 and wherein an average exposure period of the image sensor array with the first illumination and exposure control configuration active in comparison to an average exposure period of terminal with the second illumination and exposure control configuration active exhibits a ratio (a dynamic range) of less than 1:2.

A20. The indicia reading terminal of A1, wherein an average energization level of the illumination subsystem during exposure periods with the first illumination and exposure control configuration active in comparison to an average energization level of illumination subsystem during exposure periods with the second illumination and exposure control configuration active exhibits a ratio (a dynamic range) of greater than 3:1 and wherein an average exposure period of the image sensor array with the first illumination and exposure control configuration active in comparison to an average exposure period of terminal with the second illumination and exposure control configuration active exhibits a ratio (a dynamic range) of less than 1:3.

A21. The indicia reading terminal of A1, wherein an average energization level of the illumination subsystem during exposure periods with the first illumination and exposure control configuration active in comparison to an average energization level of illumination subsystem during exposure periods with the second illumination and exposure control configuration active exhibits a ratio (a dynamic range) of greater than 3:1 and wherein an average exposure period of the image sensor array with the first illumination and exposure control configuration active in comparison to an average exposure period of terminal with the second illumination and exposure control configuration active exhibits a ratio (a dynamic range) of less than 1:10.

A22. The indicia reading terminal of A1, wherein an average energization level of the illumination subsystem during exposure periods with the first illumination and exposure control configuration active in comparison to an average energization level of illumination subsystem during exposure periods with the second illumination and exposure control configuration active exhibits a ratio (a dynamic range) of greater than 5:1 and wherein an average exposure period of the image sensor array with the first illumination and exposure control configuration active in comparison to an average exposure period of terminal with the second illumination and exposure control configuration active exhibits a ratio (a dynamic range) of less than 1:5.

A23. The indicia reading terminal of A1, wherein an average energization level of the illumination subsystem during exposure periods with the first illumination and exposure control configuration active in comparison to an average energization level of illumination subsystem during exposure periods with the second illumination and exposure control configuration active exhibits a ratio (a dynamic range) of greater than 3:1 and wherein an average exposure period of the image sensor array with the first illumination and exposure control configuration active in comparison to an average exposure period of terminal with the second illumination and exposure control configuration active exhibits a ratio (a dynamic range) of less than 1:20.

A24. The indicia reading terminal of A1, wherein an average energization level of the illumination subsystem during exposure periods with the first illumination and exposure control configuration active in comparison to an average energization level of illumination subsystem during exposure periods with the second illumination and exposure control configuration active exhibits a ratio (a dynamic range) of greater than 5:1 and wherein an average exposure period of the image sensor array with the first illumination and exposure control configuration active in comparison to an average exposure period of terminal with the second illumination and exposure control configuration active exhibits a ratio (a dynamic range) of less than 1:50.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

We claim:

1. An indicia reading terminal comprising:
   an illumination subsystem for projection of an illumination pattern, the illumination subsystem having one or more light source;
   an imaging subsystem including an image sensor array and an imaging lens assembly for focusing an image of a target onto the image sensor array;
   a hand held housing incorporating the image sensor array;
   wherein the indicia reading terminal has a first illumination and exposure control configuration and a second illumination and exposure control configuration, the first illumination and control configuration having a first associated illumination control and a first associated exposure control, the second illumination and exposure control configuration having a second associated illumination control and a second associated exposure control, wherein with the first illumination control active an average energization level of the illumination subsystem during exposure periods of one or more frames is higher than with the second illumination control active, wherein with the first exposure control active an average exposure period of the image sensor array is shorter than with the second exposure control active;
   wherein the indicia reading terminal is operative so that responsively to a trigger signal activation the indicia reading terminal activates the first illumination and exposure control configuration for capturing of a first set of frames, the first set of frames comprising one or more successive frames, and activates the second illumination and exposure control configuration for capturing of a second set of frames, the second set of frames comprising one or more successive frames; and
   wherein the indicia reading terminal is operative so that responsively to the trigger signal activation the indicia reading terminal attempts to decode decodable indicia utilizing one or more frame of the first set of frames and further attempts to decode a decodable indicia utilizing one or more frame of the second set of frames;
   wherein the indicia reading terminal is adapted so that the indicia reading terminal is operative for switching between activation of the first illumination and exposure control configuration and the second illumination and exposure control configuration on a closed loop basis responsive to a sensed condition, wherein the sensed condition is a measurement of motion of the indicia reading terminal.

2. The indicia reading terminal of claim 1, wherein one or more of the first associated exposure control of the first illumination and exposure control configuration and the second associated exposure control of the second illumination and exposure control configuration is a control that allows an exposure period of the illumination subsystem to vary between frames exposed during an activation period of the associated illumination and exposure control configuration.

3. The indicia reading terminal of claim 1, wherein one or more of the first set of frames and the second set of frames is a single frame.

4. The indicia reading terminal of claim 1, wherein one or more of the first set of frames and the second set of frames is a plurality of frames.

5. The indicia reading terminal of claim 1, wherein each of the first set of frames and the second set of frames is a plurality of frames.

6. The indicia reading terminal of claim 1, wherein the indicia reading terminal is operative for activating and deactivating one or more of the first illumination and exposure control configuration and the second illumination and exposure control configuration a plurality of times responsively to the activation of the trigger signal.

7. The indicia reading terminal of claim 1, wherein the indicia reading terminal is operative so that responsively to activation of the trigger signal the indicia reading terminal activates the second illumination and exposure control configuration prior to activating the second illumination and exposure control configuration.

8. The indicia reading terminal of claim 1, wherein a light source of the illumination subsystem has a maximum continuous operation energization rating, wherein an average energization level of the light source during exposure periods of the image sensor array with the first illumination and exposure control configuration active exceeds the maximum continuous energization rating.

9. The indicia reading terminal of claim 1, wherein a light source of the illumination subsystem has a maximum continuous operation energization rating, wherein an average energization level of the light source during exposure periods with the first illumination and exposure control configuration active exceeds the maximum continuous energization rating, and wherein the average energization level of the light source during exposure periods with the second illumination and exposure control configuration active does not substantially exceed the maximum continuous operation energization rating.

10. The indicia reading terminal of claim 1, wherein a light source of the illumination subsystem has a maximum continuous operation energization rating, wherein an average energization level of the light source during exposure periods with the first illumination and exposure control configuration active is more than twice the maximum continuous energization rating, and wherein the average energization level of the light source during exposure periods with the second illumination and exposure control configuration active does not exceed the maximum continuous operation energization rating.

11. The indicia reading terminal of claim 1, wherein an average energization level of the illumination subsystem during exposure periods with the first illumination and exposure control configuration active in comparison to an average energization level of the illumination subsystem during exposure periods with the second illumination and exposure control configuration active exhibits a ratio (a dynamic range) of greater than 5:1 and wherein an average exposure period of the image sensor array with the first illumination and exposure control configuration active in comparison to an average exposure period of the image sensor array with the second illumination and exposure control configuration active exhibits a ratio (a dynamic range) of less than 1:5.

12. The indicia reading terminal of claim 1, wherein the measurement of motion is determined by monitoring an output of an accelerometer.

13. The indicia reading terminal of claim 1, wherein the measurement of motion is made by examining image data of successive frames.

14. The indicia reading terminal of claim 1, wherein each of the first set of frames and the second set of frames is a plurality of frames, wherein the first associated illumination control is characterized by a certain fixed energization level, wherein the first associated exposure control is characterized by a certain fixed duration, wherein the second associated illumination control is characterized by a certain fixed energization level, wherein the second associated exposure control is characterized by a certain fixed duration.

15. The indicia reading terminal of any of claims 1, wherein the illumination subsystem includes a first light source, wherein during exposure periods with the first illumination and exposure control configuration active the first light source is energized, and wherein during exposure periods with the second illumination and exposure control configuration active the first light source is energized.

16. The indicia reading terminal of claim 15, wherein each of the first set of frames and the second set of frames is a plurality of frames, wherein the first associated illumination control is characterized by a certain fixed energization level, wherein the first associated exposure control is characterized by a certain fixed duration, wherein the second associated illumination control is characterized by a certain fixed energization level, wherein the second associated exposure control is characterized by a certain fixed duration.

17. An indicia reading terminal comprising:
an illumination subsystem for projection of an illumination pattern, the illumination subsystem having a first light source;
an imaging subsystem including an image sensor array and an imaging lens assembly for focusing an image of a target onto the image sensor array;
a hand held housing incorporating the image sensor array;
wherein the indicia reading terminal has a first illumination and exposure control configuration and a second illumination and exposure control configuration, the first illumination and control configuration having a first associated illumination control and a first associated exposure control, the second illumination and exposure control configuration having a second associated illumination control and a second associated exposure control, wherein with the first associated illumination control active an average energization level of the illumination subsystem during exposure periods of one or more frames is higher than with the second associated illumination control active, wherein with the first associated exposure control active an average exposure period of the image sensor array is shorter than with the second associated exposure control active;
wherein the indicia reading terminal is operative so that responsively to a trigger signal activation the indicia reading terminal activates the first illumination and exposure control configuration for capturing of a first set of frames, the first set of frames comprising one or more successive frames, and activates the second illumination and exposure control configuration for capturing of a second set of frames, the second set of frames comprising one or more successive frames; and wherein the indicia reading terminal is operative so that responsively to the trigger signal activation the indicia reading terminal attempts to decode decodable indicia utilizing one or more frame of the first set of frames and further attempts to decode a decodable indicia utilizing one or more frame of the second set of frames;

wherein an average energization level of the illumination subsystem during exposure periods with the first illumination and exposure control configuration active in comparison to an average energization level of the illumination subsystem during exposure periods with the second illumination and exposure control configuration active exhibits a ratio (a dynamic range) of greater than 2:1 and wherein an average exposure period of the image sensor array with the first illumination and exposure control configuration active in comparison to an average exposure period of terminal the image sensor array with the second illumination and exposure control configuration active exhibits a ratio (a dynamic range) of less than 1:2, wherein during exposure periods with the first illumination and exposure control configuration active the first light sources is energized, and wherein during exposure periods with the second illumination and exposure control configuration active the first light source is energized.

18. The indicia reading terminal of claim 17, wherein an average energization level of the illumination subsystem during exposure periods with the first illumination and exposure control configuration active in comparison to an average energization level of the illumination subsystem during exposure periods with the second illumination and exposure control configuration active exhibits a ratio (a dynamic range) of greater than 3:1 and wherein an average exposure period of the image sensor array with the first illumination and exposure control configuration active in comparison to an average exposure period of the image sensor array with the second illumination and exposure control configuration active exhibits a ratio (a dynamic range) of less than 1:3.

19. The indicia reading terminal of claim 17, wherein an average energization level of the illumination subsystem during exposure periods with the first illumination and exposure control configuration active in comparison to an average energization level of the illumination subsystem during exposure periods with the second illumination and exposure control configuration active exhibits a ratio (a dynamic range) of greater than 3:1 and wherein an average exposure period of the image sensor array with the first illumination and exposure control configuration active in comparison to an average exposure period of the image sensor array with the second illumination and exposure control configuration active exhibits a ratio (a dynamic range) of less than 1:10.

20. The indicia reading terminal of claim 17, wherein an average energization level of the illumination subsystem during exposure periods with the first illumination and exposure control configuration active in comparison to an average energization level of the illumination subsystem during exposure periods with the second illumination and exposure control configuration active exhibits a ratio (a dynamic range) of greater than 3:1 and wherein an average exposure period of the image sensor array with the first illumination and exposure control configuration active in comparison to an average exposure period of the image sensor array with the second illumination and exposure control configuration active exhibits a ratio (a dynamic range) of less than 1:20.

21. The indicia reading terminal of claim 17, wherein an average energization level of the illumination subsystem during exposure periods with the first illumination and exposure control configuration active in comparison to an average energization level of the illumination subsystem during exposure periods with the second illumination and exposure control configuration active exhibits a ratio (a dynamic range) of greater than 5:1 and wherein an average exposure period of the image sensor array with the first illumination and exposure control configuration active in comparison to an average exposure period of the image sensor array with the second illumination and exposure control configuration active exhibits a ratio (a dynamic range) of less than 1:50.

22. The indicia reading terminal of claim 17, wherein a switching between said first illumination and exposure control configuration and said second illumination and exposure control configuration is on an open loop basis without the switching being responsive to a sensed condition.

23. The indicia reading terminal of claim 17, wherein a switching between said first illumination and exposure control configuration and said second illumination and exposure control configuration is responsive to a measurement of motion of the indicia reading terminal.

24. The indicia reading terminal of claim 17, wherein a switching between said first illumination and exposure control configuration and said second illumination and exposure control configuration is responsive to a range of the indicia reading terminal.

25. The indicia reading terminal of claim 17, wherein a switching between said first illumination and exposure control configuration and said second illumination and exposure control configuration is responsive to a failure to decode decodable indicia.

26. The indicia reading terminal of claim 17, wherein each of the first set of frames and the second set of frames is a plurality of frames, wherein the first associated illumination control is characterized by a certain fixed energization level, wherein the first associated exposure control is characterized by a certain fixed duration, wherein the second associated illumination control is characterized by a certain fixed energization level, wherein the second associated exposure control is characterized by a certain fixed duration.

27. The indicia reading terminal of claim 26, wherein a switching between said first illumination and exposure control configuration and said second illumination and exposure control configuration is on an open loop basis without the switching being responsive to a sensed condition.

28. The indicia reading terminal of claim 26, wherein a switching between said first illumination and exposure control configuration and said second illumination and exposure control configuration is responsive to a measurement of motion of the indicia reading terminal.

29. The indicia reading terminal of claim 26, wherein a switching between said first illumination and exposure control configuration and said second illumination and exposure control configuration is responsive to a range of the indicia reading terminal.

30. The indicia reading terminal of claim 26, wherein a switching between said first illumination and exposure control configuration and said second illumination and exposure control configuration is responsive to a failure to decode decodable indicia.

* * * * *